(12) United States Patent
Wang et al.

(10) Patent No.: US 8,912,242 B2
(45) Date of Patent: *Dec. 16, 2014

(54) POLAR POLYSTYRENE COPOLYMERS FOR ENHANCED FOAMING

(75) Inventors: Wei Wang, League City, TX (US); David W. Knoeppel, League City, TX (US); Melissa Greenberg, Katy, TX (US)

(73) Assignee: Fina Technology, Inc., Houston, TX (US)

( * ) Notice: Subject to any disclaimer, the term of this patent is extended or adjusted under 35 U.S.C. 154(b) by 310 days.

This patent is subject to a terminal disclaimer.

(21) Appl. No.: 13/347,706

(22) Filed: Jan. 11, 2012

(65) Prior Publication Data

US 2012/0208911 A1 Aug. 16, 2012

Related U.S. Application Data

(60) Provisional application No. 61/441,389, filed on Feb. 10, 2011.

(51) Int. Cl.
| | |
|---|---|
| *C08J 9/06* | (2006.01) |
| *C08J 9/10* | (2006.01) |
| *C08F 212/08* | (2006.01) |
| *C08J 9/12* | (2006.01) |
| *C08J 9/00* | (2006.01) |
| *C08J 9/14* | (2006.01) |

(52) U.S. Cl.
CPC .............. *C08F 212/08* (2013.01); *C08J 9/12* (2013.01); *C08J 2203/06* (2013.01); *C08J 9/0023* (2013.01); *C08J 2203/12* (2013.01); *C08J 9/142* (2013.01); *C08J 2325/08* (2013.01); *C08J 2203/10* (2013.01)
USPC ............................... 521/56; 521/146; 521/147

(58) Field of Classification Search
CPC ................ C08J 9/16; C08J 9/18; C08J 9/122; C08J 9/125; C08J 2203/02; C08J 2203/06; C08J 2325/08; C08J 2325/14; C08J 2335/06; C08J 1/125; C08J 2325/06
USPC ........................................... 521/56, 146, 147
See application file for complete search history.

(56) References Cited

U.S. PATENT DOCUMENTS

| | | | | |
|---|---|---|---|---|
| 3,960,784 | A | * | 6/1976 | Rubens ........................... 521/60 |
| 4,442,232 | A | * | 4/1984 | Kajimura et al. ............... 521/56 |
| 4,448,933 | A | * | 5/1984 | Rubens ......................... 525/123 |
| 4,547,527 | A | * | 10/1985 | Ingram ........................... 521/60 |
| 5,010,111 | A | | 4/1991 | Hahn et al. |
| 5,128,073 | A | * | 7/1992 | Allen et al. .................... 264/417 |
| 5,190,984 | A | * | 3/1993 | Dan et al. ........................ 521/59 |
| 5,240,967 | A | * | 8/1993 | Sonnenberg et al. ........... 521/57 |
| 2007/0157948 | A1 | | 7/2007 | Gonzales et al. |
| 2008/0108718 | A1 | | 5/2008 | Krupinski et al. |
| 2009/0069455 | A1 | | 3/2009 | Sekiya et al. |
| 2009/0234035 | A1 | | 9/2009 | Cheung et al. |

FOREIGN PATENT DOCUMENTS

JP 03-06810 a * 3/1991

* cited by examiner

*Primary Examiner* — Irina S Zemel

(57) ABSTRACT

A method of making a foamable polystyrene composition includes combining a styrenic monomer and a co-monomer containing a polar functional group to obtain a mixture, subjecting the mixture to polymerization to obtain a styrenic co-polymer, and combining the styrenic co-polymer with a blowing agent in a foaming process to obtain foamed articles.

22 Claims, 6 Drawing Sheets

Experimental Scheme of Dynamic Gravimetric Measurement of $CO_2$ Solubility $CO_2$ Desorption Diffusivity vs. $CO_2$ Solubility (Excluding SAN)

CO$_2$ Desorption Diffusivity vs. Normalized CO$_2$ Solubility contribution by Co-monomer Type

POLAR POLYSTYRENE COPOLYMERS FOR ENHANCED FOAMING

CROSS-REFERENCE TO RELATED APPLICATIONS

This application is a non-provisional of U.S. Provisional Application Ser. No. 61/441,389 filed Feb. 10, 2011.

FIELD

The present invention is generally related to polymeric compositions. More specifically, the present invention is related to foamable polystyrene compositions.

BACKGROUND

Styrene, also known, as vinyl benzene, is an aromatic compound that is produced in industrial quantities from ethylbenzene. The most common method of styrene production comprises the dehydrogenation of ethylbenzene, which produces a crude product of styrene monomer and unreacted ethylbenzene and hydrogen. Polystyrene is an aromatic polymer produced from the styrene monomer. Polystyrene is a widely used polymer found in insulation, packaging, and disposable cutlery.

Different types of polystyrene materials can include general-purpose polystyrene (GPPS), high impact polystyrene (HIPS), and transparent impact polystyrene (TIPS). Many conditions affect the properties of the resulting product, including processing time, temperature, pressure, purity of the monomer feedstock, and the presence of additives or other compounds. These and other processing conditions alter the physical and chemical properties of the polystyrene product, affecting the suitability for a desired use.

Foamed polystyrene offers the advantages of low cost and high structural strength for its density. A typical polystyrene foam also has a relatively high impact resistance and possesses excellent electrical and thermal insulation characteristics. Foamed polystyrene is useful in a variety of applications such as insulation, packaging, coolers, food packaging, decorative pieces, and dunnage. Additionally, polystyrene foams are commonly classified into three general categories: low density, medium density, and high density. Low density polystyrene foams usually have a density of from about 1 to about 3 lb/ft$^3$ whereas medium density foams may have a density ranging from about 4 to about 19 lb/ft$^3$ and high density foams often have a density ranging from 20 to about 30 lb/ft$^3$.

The two main types of polystyrene foam are extruded polystyrene (XPS) foam and expanded polystyrene (EPS) foam. Extruded polystyrene foam is typically formed by mixing polystyrene with additives and blowing agents into an extruder that heats the mixture. The mixture is then extruded, foamed to the desired shape, and cooled. Expanded polystyrene foam is typically formed by expanding solid polystyrene beads containing a blowing agent such as pentane with steam or hot gas. These pre-expanded beads may later be molded into the desired shape and expanded again with steam or hot gas to fuse the beads together.

In the production of foamed polystyrene, it is common to utilize blowing agents such as methyl chloride, ethyl chloride, chlorocarbons, fluorocarbons (including HFCs) and chlorofluorocarbons (CFCs). However, such blowing agents have been heavily regulated due to potential environmental impact. Many of these traditional and current physical blowing agents are halogenated compounds, which demonstrate a high solubility in polar polymers. An ongoing trend in foaming process development is to find environmentally benign chemicals as blowing agents. Some foaming processes have been using carbon dioxide ($CO_2$) as the blowing agent or co-blowing agent. The advantages of using $CO_2$ include low cost, minimal environmental impact, and eliminating potential fire hazards. It has therefore been desirable to use carbon dioxide as a blowing agent from both environmental and economic standpoints.

However, carbon dioxide has presented problems when used as a blowing agent. Carbon dioxide has been found to have a relatively low solubility in styrenic polymer melts. For example, the solubility of $CO_2$ in polystyrene is only ca. 4 wt % at 6.5 MPa and 373 K, as measured by Yoshiyuki Sato et. al. (*Journal of Supercritical Fluids* 2001, 19, 187-198.). The low solubility results in high extrusion pressures, which increases costs and reduces quality. The low solubility also results in a higher density product. It would be desirable to obtain a polystyrene product having a high carbon dioxide solubility in order to reduce costs and increase product quality.

Furthermore, carbon dioxide has relatively higher vapor pressure and diffusivity, compared to halogenated blowing agents. In the extrusion foaming process using CO2 as the blowing agent, the melt strength of polystyrene is often inadequate, which leads to immature bubble breakage/coalescence, non-uniform cell morphology, and excessive open cell content. It would be desirable to obtain a polystyrene resin having improved melt strength in order to perform well in foaming processes.

SUMMARY

An embodiment of the present invention is a polystyrene product that is a styrenic co-polymer resulting from polymerization of a reaction mixture of a styrenic monomer and co-monomers having polar functional groups. The polystyrene can then be used in an extrusion foaming process with the presence of blowing agents.

In a non-limiting embodiment, either by itself or in combination with any other aspect of the invention, the styrenic monomer can be selected from the group consisting of styrene, alpha-methyl styrene, vinyl toluene, p-methyl styrene, t-butyl styrene, o-chlorostyrene, vinyl pyridine, and any combinations thereof, and can be present in amounts ranging from 80 to 99.9 wt % based on the total weight of the expandable polystyrene.

In a non-limiting embodiment, either by itself or in combination with any other aspect of the invention, the co-monomer can be selected from the group consisting of hydroxyethylmethacrylate (HEMA), caprolactone acrylate, alkyl (meth)acrylate, fluorinated (meth)acrylate and any other polymerizable monomers containing esters, ethers, carboxylic acids or silanes, and combinations thereof, and can be present in amounts ranging from 0.5 to 20 wt % based on the total weight of the reaction mixture.

In a non-limiting embodiment, either by itself or in combination with any other aspect of the invention, the blowing agent can be carbon dioxide ($CO_2$), water ($H_2O$), ethanol, air, nitrogen, argon, and helium and combinations thereof and can be present in the styrenic co-polymer in a weight proportion ranging from 1 to 30 parts per 100 parts of styrenic material.

In a non-limiting embodiment, either by itself or in combination with any other aspect of the invention, the present invention includes any article made from the polystyrene of any embodiment disclosed herein.

Other possible embodiments include two or more of the above aspects of the invention. In an embodiment the method includes all of the above aspects and the various procedures can be carried out in any order.

DETAILED DESCRIPTION

Figure 1:
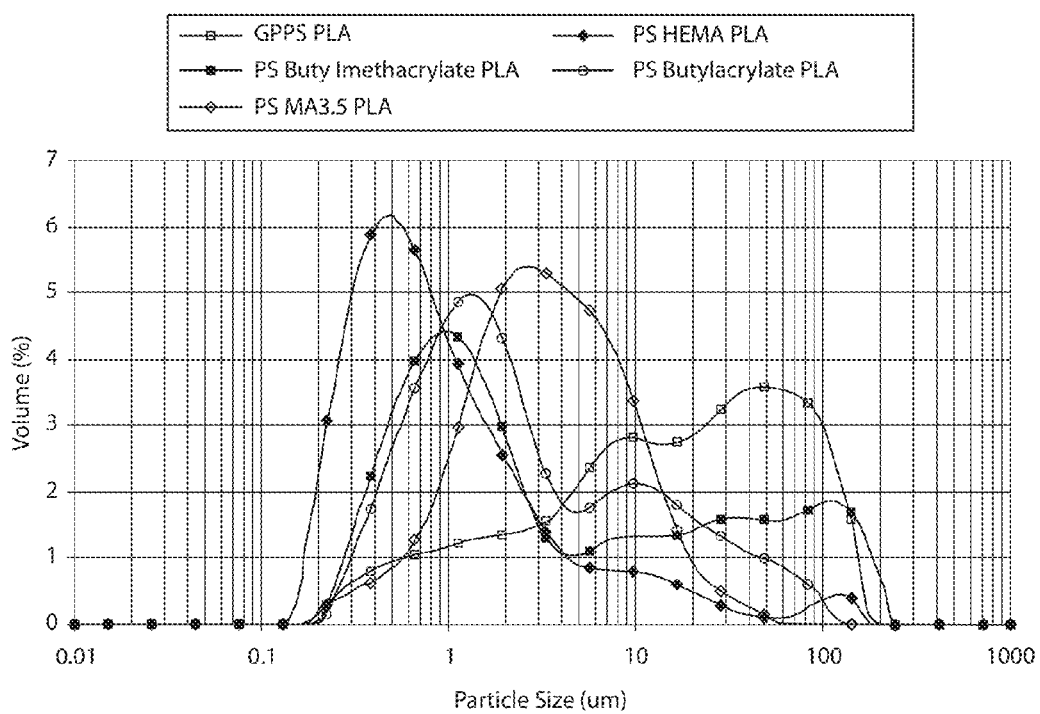
FIG. 1 is a graph illustrating polylactic acid (PLA) particle size distribution from PLA blends with various polystyrene copolymers.

The present invention includes styrenic polymers and polymer blends. In an embodiment, the present invention includes styrenic copolymers of styrene and a second monomer containing a polar functional group. In a more specific embodiment, the present invention includes a foamable polymeric composition containing such styrenic copolymers.

In an embodiment, the present invention includes a styrenic polymer. In another embodiment, the styrenic polymer includes polymers of monovinylaromatic compounds, such as styrene, alpamethyl styrene and ring-substituted styrenes. In an alternative embodiment, the styrenic polymer includes a homopolymer and/or copolymer of polystyrene. Styrenic monomers for use in the styrenic polymer composition can be selected from the group of styrene, alpha-methyl styrene, vinyl toluene, t-butyl styrene, o-chlorostyrene, vinyl pyridine, and any combinations thereof. The styrenic polymeric component in the blend of the present invention can be produced by any known process.

The styrenic polymer of the present invention may include general-purpose polystyrene (GPPS), high-impact polystyrene (HIPS), styrenic copolymer compositions, or any combinations thereof. In an embodiment, the HIPS contains an elastomeric material. In an embodiment, the HIPS contains an elastomeric phase embedded in the polystyrene matrix, which results in the polystyrene having an increased impact resistance.

The blend of the present invention may contain any desired amounts of a styrenic polymer. In an embodiment, the blend contains at least 50 wt % of a styrenic polymer. In another embodiment, the blend contains a styrenic polymer in amounts ranging from 1 to 99 wt %, 50 to 95 wt %, 60 to 92 wt %, and optionally 70 to 90 wt %. In a further embodiment, the blend contains a styrene polymer in amounts ranging from 80 to 99 wt %. In an even further embodiment, the blend contains a styrenic polymer in amounts ranging from 90 to 95 wt %.

The styrenic polymer of the present invention may be formed by co-polymerizing a first monomer with a second monomer. The first monomer and the second monomer may be co-polymerized by having the first monomer and the second monomer present in a reaction mixture that is subjected to polymerization conditions. The first monomer may include monovinylaromatic compounds, such as styrene, alpha-methyl styrene and ring-substituted styrenes. In an embodiment, the first monomer is selected from the group of styrene, alpha-methyl styrene, vinyl toluene, t-butyl styrene, o-chlorostyrene, vinyl pyridine, and any combinations thereof. In another embodiment, styrene is used exclusively as the first monomer. In an embodiment, the first monomer is present in the reaction mixture in amounts of at least 50 wt % of the reaction mixture. In another embodiment, the first monomer is present in the reaction mixture in amounts ranging from 80 to 99.9 wt % of the reaction mixture. In a further embodiment, the first monomer is present in the reaction mixture in amounts ranging from 90 to 99 wt %. Embodiments of the second monomer can be any suitable monomer capable of polymerization to form a styrenic copolymer. Examples of suitable second monomers can include hydroxyethylmethacrylate, caprolactone acrylate, alkyl (meth)acrylate, fluorinated (meth)acrylate and any other polymerizable monomers containing polar functionalities such as esters, ethers, carboxylic acids or silanes, and combinations thereof.

Embodiments of the present invention include at least one second monomer containing a polar functional group. The second monomer containing a polar functional group may also be referred to herein as a "polar monomer". In an embodiment, the polar monomer is a polar vinyl functional monomer. In another embodiment, the polar monomer is selected from the group of hydroxyethylmethacrylate, caprolactone acrylate, alkyl (meth)acrylate, fluorinated (meth) acrylate and any other polymerizable monomers containing polar functionalities such as esters, ethers, carboxylic acids or silanes, and combinations thereof. In a further embodiment, the polar monomer is selected from the group of caprolactone acrylate, polyvinyl acetate, and HEMA, and combinations thereof. In an even further embodiment, the polar monomer is HEMA. In another embodiment the second monomer may be selected from the group of, maleic anhydride (MAH), butyl acrylate, butyl methacrylate, and combinations thereof.

The styrenic polymer of the present invention may be prepared by polymerizing a reaction mixture containing a first monomer and a second monomer having a polar functional group. The first monomer and second monomer may be present in the reaction mixture in any desired amounts. In an embodiment, the second monomer is present in the reaction mixture in amounts of at least 0.1 wt % of the reaction mixture. In another embodiment, the second monomer is present in the reaction mixture in amounts of less than 20 wt % of the reaction mixture. In an alternative embodiment, the second monomer is present in the reaction mixture in amounts ranging from 1 to 20 wt %. In a further embodiment, the second monomer is present in the reaction mixture in amounts ranging from 1 to 10 wt %. In an even further embodiment, the second monomer is present in the reaction mixture in amounts ranging from 1 to 5 wt %.

The polymerization of the styrenic monomer and the polar co-monomer may be carried out using any method known to one having ordinary skill in the art or performing such polymerizations. In an embodiment, the polymerization may be carried out by using a polymerization initiator. In an embodiment, the polymerization initiators include but are not limited to perketals, hydroperoxides, peroxycarbonates and the like. In another embodiment, the polymerization initiators may be selected from the group of benzoyl peroxide, lauroyl peroxide, t-butyl peroxybenzoate, and 1,1-di-t-butylperoxy-2,4-di-t-butylcyclohexane, and combinations thereof. In an embodiment, the amount of the polymerization initiator is from 0.01 to 1.0 wt % of the reaction mixture. In another embodiment, the amount of the polymerization initiator is from 0.01 to 0.5 wt % of the reaction mixture. In a further embodiment, the amount of the polymerization initiator is from 0.025 to 0.05 wt % of the reaction mixture.

Any process capable of processing or polymerizing styrenic monomers may be used to prepare the styrenic co-polymer of the present invention. In an embodiment, the polymerization reaction to prepare the styrenic co-polymer may be carried out in a solution or mass polymerization process. Mass polymerization, or bulk polymerization, refers to the polymerization of a monomer in the absence of any medium other than the monomers and a catalyst or polymerization initiator. Solution polymerization refers to a polymerization process in wherein the monomers and polymerization initiators are dissolved in a non-monomeric liquid solvent at the beginning of the polymerization reaction.

The polymerization may be either a batch process or a continuous process. In an embodiment, the polymerization reaction may be carried out using a continuous production process in a polymerization apparatus including a single reactor or multiple reactors. The styrenic polymer composition can be prepared using an upflow reactor, a downflow reactor, or any combinations thereof. The reactors and conditions for the production of a polymer composition, specifically polystyrene, are disclosed in U.S. Pat. No. 4,777,210, which is incorporated by reference herein in its entirety.

The temperature ranges useful in the polymerization process of the present disclosure can be selected to be consistent with the operational characteristics of the equipment used to perform the polymerization. In an embodiment, the polymerization temperature ranges from 90 to 240° C. In another embodiment, the polymerization temperature ranges from 100 to 180° C. In yet another embodiment, the polymerization reaction may be carried out in multiple reactors in which each reactor is operated under an optimum temperature range. For example, the polymerization reaction may be carried out in a reactor system employing a first polymerization reactor and a second polymerization reactor that may be either continuously stirred tank reactors (CSTR) or plug-flow reactors. In an embodiment, a polymerization process for the production of a styrenic co-polymer of the type disclosed herein containing multiple reactors may have the first reactor (e.g., a CSTR), also referred to as a prepolymerization reactor, operated under temperatures ranging from 90 to 135° C. while the second reactor (e.g. CSTR or plug flow) may be operated under temperatures ranging from 100 to 165° C.

In an alternative embodiment, the co-polymer may be obtained by polymerization in which heat is used as the initiator. In a further embodiment, the co-polymer may be prepared using a non-conventional initiator such as a metallocene catalyst as is disclosed in U.S. Pat. No. 6,706,827 to Lyu, et al., which is incorporated herein by reference in its entirety. In one embodiment, the monomers may be admixed with a solvent and then polymerized. In another embodiment, one of the monomers is dissolved in the other and then polymerized. In still another embodiment, the monomers may be fed concurrently and separately to a reactor, either neat or dissolved in a solvent, such as mineral oil. In yet another embodiment, the second monomer may be prepared in-situ or immediately prior to the polymerization by admixing the raw material components, such as an unsaturated acid or anhydride and a metal alkoxide, in-line or in the reactor. Any process for polymerizing monomers having polymerizable unsaturation know to be useful to those of ordinary skill in the art in preparing such polymers may be used. For example, the process disclosed in U.S. Pat. No. 5,540,813 to Sosa, et al., may be used and is incorporated herein by reference in its entirety. The processes disclosed in U.S. Pat. No. 3,660,535 to Finch, et al., and U.S. Pat. No. 3,658,946 to Bronstert, et al., may be used and are both incorporated herein by reference in their entirety. Any process for preparing general purpose polystyrene may be used to prepare the styrenic co-polymer of the present invention.

In certain embodiments, the styrenic copolymer may be admixed with additives prior to being used in end use applications. For example, the styrenic copolymer may be admixed with additives that include without limitation, antioxidants, UV stabilizers or absorbents, lubricants, plasticizers, ultra-violet screening agents, oxidants, anti-static agents, fire retardants, processing oils, mold release agents, fillers, pigments/dyes, coloring agents, and other similar compositions. Any additive known to those of ordinary skill in the art to be useful in the preparation of styrenic copolymers may be used. $CO_2$ solubility may increase for lower molecular weight polystyrene copolymer, therefore, it would be desirable to maintain or control the molecular weight of the styrenic copolymer. In an embodiment, chain transfer agents and/or diluents may be added before and/or during polymerization in order to help control the molecular weight of the resulting styrenic copolymer.

The obtained polystyrene copolymer may then be sent to an extruder or other step to obtain an end use article. The blowing agents such as HFC or $CO_2$ can be added into the polymer during the extrusion process.

In an embodiment, styrene monomer is combined with a polar comonomer and a plasticizer and subsequently polymerized to form a polar polystyrene copolymer. The polar polystyrene copolymer can then be sent to an extruder or other step to obtain an end use article. The blowing agents are added to the polystyrene containing composition during the extruding step.

In an embodiment, styrene monomer is combined with a second polar monomer and subsequently polymerized to form a polystyrene copolymer. In an embodiment, the polystyrene copolymer is sent to an extruder or other step to obtain an end use article. The blowing agents are added to the polystyrene containing composition during the extruding step.

The present invention may include foamed articles which may be formed by melting and mixing the styrenic copolymer of the invention to form a polymer melt, incorporating a blowing agent into the polymer melt to form a foamable blend, and extruding the foamable blend through a die to form the foamed structure. During melting and mixing, the polymeric material may be heated to a temperature at or above the glass transition temperature of the polymeric material. The melting and mixing of polymeric material and any additives may be accomplished by any means known in the art, including extruding, mixing, and/or blending. In an embodiment, a blowing agent is blended with molten polymeric material. The blending of the blowing agent with the molten polymeric material may be performed under atmospheric or elevated pressures.

In an embodiment, the blowing agent is incorporated into the styrenic copolymer in a weight proportion ranging from 1 to 30 parts per 100 parts of the polymeric material to be foamed. In another embodiment, the blowing agent is incorporated into the styrenic copolymer in a weight proportion ranging from 2 to 18 per 100 parts per polymeric material to be foamed. In a further embodiment, the blowing agent is incorporated into the styrenic copolymer in a weight proportion ranging from 4 to 12 parts per 100 parts per polymeric material to be foamed.

The blowing agents of the present invention may include organic and/or inorganic compounds. In an embodiment, the blowing agents of the present invention are environmentally benign than methyl chloride, ethyl chloride, chlorocarbons, fluorocarbons (including HFCs) and chlorofluorocarbons (CFCs). In a further embodiment, the blowing agents of the present invention are selected from the group of carbon dioxide ($CO_2$), water ($H_2O$), ethanol, air, nitrogen, argon, butane, pentane, and helium and combinations thereof. In an even further embodiment, the blowing agent of the present invention is entirely composed of $CO_2$.

The foamable blend may be cooled after the blowing agent is incorporated into the styrenic blend. In an embodiment, the foamable blend is cooled to temperatures ranging from 30 to 150° C., optionally 75 to 150° C. The cooled foamable blend may then be passed through a die into a zone of lower pressure to form an article of foamed structure. The polystyrene copolymer can be used for not only foams, but also rigid blends.

The obtained foamed polystyrene copolymer may have any desired density. In an embodiment, the density of the foamed polystyrene copolymer ranges from 15 to 0.1 lbs/ft$^3$. In another embodiment, the density of the foamed polystyrene copolymer ranges from 10 to 0.5 lbs/ft$^3$. In a further embodiment, the density of the foamed polystyrene copolymer ranges from 3 to 0.6 lbs/ft$^3$.

An end use article may include a polystyrene copolymer of the present invention. In an embodiment, the articles include films and thermoformed or foamed articles. For example, a final article may be thermoformed from a sheet containing the polystyrene copolymer. In another embodiment, the end use articles include foamed articles, which may have a foamed structure. In an embodiment, an article can be obtained by subjecting the polymeric composition to a plastics shaping process such as extrusion. The polymeric composition may be formed into end use articles including food packaging, food/beverage containers, polymeric foam substrate, foamed insulation, building insulation, protective head gear, toys, dunnage, and the like.

In an embodiment, the obtained polystyrene foam is a multicellular article having a plurality of cells that may be open or closed. In another embodiment, the majority of the cells are open. In an alternative embodiment, the majority of the cells are closed.

EXAMPLES

Example 1

A series of polystyrene samples were made with the addition of polar modifiers as listed in Table 1 below. The polymerization reaction was carried out in a CSTR-type batch reactor. Lupersol-233 was added as the initiator with an initial concentration of about 170 ppm in the reaction mixture. The reaction was then run isothermally at 130° C. with continuous agitation at 150 rpm for about 3 hours or until 75% conversion was obtained. The reaction mixture was then transferred onto an aluminum surface and devolatized under active vacuum of less than 10 torr at 225° C. for 45 minutes.

The polar modifiers listed in Table 1 include styrene-maleic anhydride (SMA), a copolymer of styrene and maleic anhydride, which are commercially available from Sartomer Company, Inc. SMA® 1000P, SMA® 3000P and SMA® EF80 have styrene-to-maleic anhydride molar ratios of 1:1, 3:1 and 8:1, respectively. The polar modifiers also include butyl acrylate, butyl methacrylate, hydroxyethylmethacrylate (HEMA), and maleic anhydride (MAH). The loading of modifiers is 5 wt %, except for maleic anhydride (MAH). The loading of MAH is limited to 3.5 wt % and, in a separate sample, 1.75 wt % due to its limited solubility in styrene. In Table 1, below, PDI represents polydispersity index wherein PDI=Mw/Mn, $Tg_1$ represents the first glass transition temperature and $Tg_2$ represents a second glass transition temperature, if applicable.

TABLE 1

Characterization of Modified Polystyrene

| Modifier | None | SMA 1000P (1:1) | SMA 3000P (3:1) | SMA EF80 (8:1) |
|---|---|---|---|---|
| wt % | 0 | 5.0 | 5.0 | 5.0 |
| mol(# of moles of polar monomer unit)/(100 g of polymer) | 0 | 0.025 | 0.012 | 0.005 |
| Transparency | Clear | Opaque | Opaque | Opaque |
| $Tg_1$ | 105.2 | 104.8 | 104.5 | 104.4 |
| $Tg_2$ | n/a | 169.3 | n/a | n/a |
| Melt Flow Rate | 2.1 | 2.2 | 2.8 | 2.9 |
| Mn | 130,000 | 138,000 | 132,000 | 84,100 |
| Mw | 271,000 | 273,000 | 269,000 | 262,000 |
| Mz | 415,000 | 439,000 | 418,000 | 417,000 |
| PDI | 2.1 | 2.0 | 2.0 | 3.1 |
| Peak MW | 259,000 | 255,000 | 259,000 | 265,000 |

| Modifier | Butyl Acrylate | Butyl Methacrylate | HEMA | MAH | MAH |
|---|---|---|---|---|---|
| wt % | 5.0 | 5.0 | 5.0 | 1.75 | 3.5 |
| mol(# of moles of polar monomer unit)/(100 g of polymer) | 0.039 | 0.035 | 0.038 | 0.018 | 0.036 |
| Transparency | Clear | Clear | Clear | Clear | Semi-clear |
| $Tg_1$ | 94.8 | 98.2 | 102.6 | 105.0 | 104.0 |
| $Tg_2$ | n/a | n/a | n/a | n/a | n/a |
| Melt Flow Rate | 3.3 | 2.9 | 1.7 | 2.2 | 3.3 |
| Mn | 136,000 | 122,000 | 128,000 | 115,000 | 97,300 |
| Mw | 184,000 | 260,000 | 312,000 | 250,000 | 220,000 |

TABLE 1-continued

| Characterization of Modified Polystyrene | | | | | |
|---|---|---|---|---|---|
| Mz | 433,000 | 398,000 | 529,000 | 391,000 | 350,000 |
| PDI | 2.1 | 2.1 | 2.4 | 2.2 | 2.3 |
| Peak MW | 271,000 | 250,000 | 270,000 | 239,000 | 212,000 |

Figure 2:
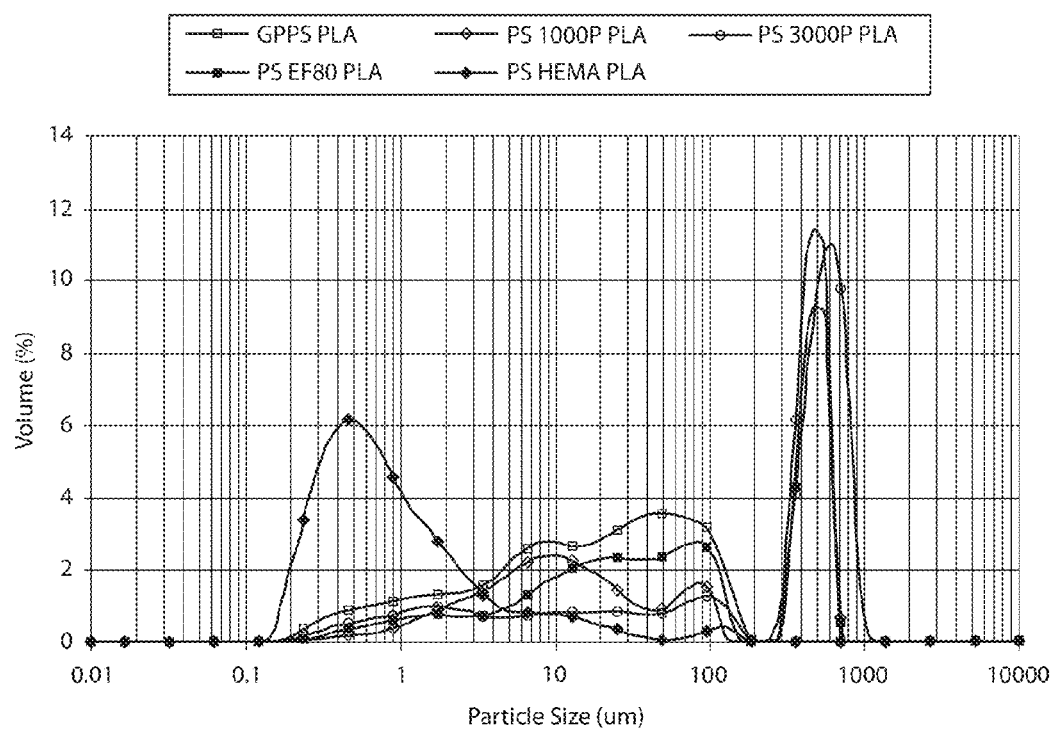
FIG. 2 is a graph illustrating PLA particle size distribution from PLA blends modified with styrene-maleic anhydride (SMA).

An indicator of polarity change in polystyrene is how well the material blends with another polar polymer such as polylactic acid (PLA). In this experiment, the modified polystyrene samples above were blended with 5 wt. % PLA 3251D (NatureWorks® Ingeo™) in a Haake mixer. The Haake mixer was operated at a temperature of 210° C. under a nitrogen atmosphere for 3 minutes with agitation speeds of 60 rpm. The size of the PLA particles in the blends were evaluated by solution dynamic light scattering. The blend samples were dispersed in methyl ethyl ketone (MEK), a good solvent for polystyrene but not for PLA. FIG. 1 and FIG. 2 show the PLA particle size distribution from different polystyrene blends. FIG. 1 compares polystyrene copolymerized with different comonomers. All of the polystyrene copolymer samples show improved dispersion of PLA when compared to crystal polystyrene, which suggests the polarity change in PS and better polar interaction with PLA. Use of HEMA in PS gave the best result with a relatively narrower distribution peaked at particle sizes of 0.5 µm. Similar but slightly worse results were obtained with polystyrene modified by butyl-acrylate/methacryates as well as maleic anhydride.

FIG. 2 compares polystyrene modified with different styrene-maleic anhydride copolymers (SMAs). The SMAs were incorporated into polystyrene during batch reactions. The PLA particle size distributions from the SMA blends did not seem to improve much compared to unmodified PS. The SMAs were not as effective as polar comonomers, probably due to the relatively lower molar concentration of polar groups of SMAs under the same weight percentage loading (see Table 1 above). In addition, the SMAs containing the higher percentage of maleic anhydride (such as 1000P and 3000P) are less soluble in styrene. A miscible blend of GPPS and SMA was only made with SMA EF80, which has a styrene-to-maleic anhydride of 8:1 and contains the lowest concentration of maleic anhydride among the various SMAs used. FIG. 2 also shows that use of HEMA comonomer achieved the best result with a relatively narrower particle size distribution peaked at particle sizes of 0.5 µm.

Example 2

Hydroxyl functional polystyrene was prepared in a batch reaction process by copolymerizing styrene with 2-hydroxyethyl methacrylate (HEMA) at varied concentrations ranging from 0 to 5 wt. % in the feed (see Table 2). The polymerization reaction was carried out in a CSTR-type batch reactor. Lupersol-233 was added as the initiator with an initial concentration of about 170 ppm in the reaction mixture. The reaction was then run isothermally at 130° C. with continuous agitation at 150 rpm for about 3 hours or until 75% conversion was obtained. The reaction mixture was then transferred onto an aluminum surface and devolatized under active vacuum of less than 10 torr at 225° C. for 45 minutes.

TABLE 2

| Feed Formulations in Batch Synthesis of HEMA-modified polystyrene | | | | |
|---|---|---|---|---|
| Run No. | 1 | 2 | 3 | 4 |
| Styrene (grams) | 200 | 198 | 195 | 190 |
| HEMA (grams) | 0 | 2 | 5 | 10 |
| HEMA (wt. %) | 0 | 1.0 | 2.5 | 5.0 |
| TOTAL (grams) | 200 | 200 | 200 | 200 |

Figure 3:
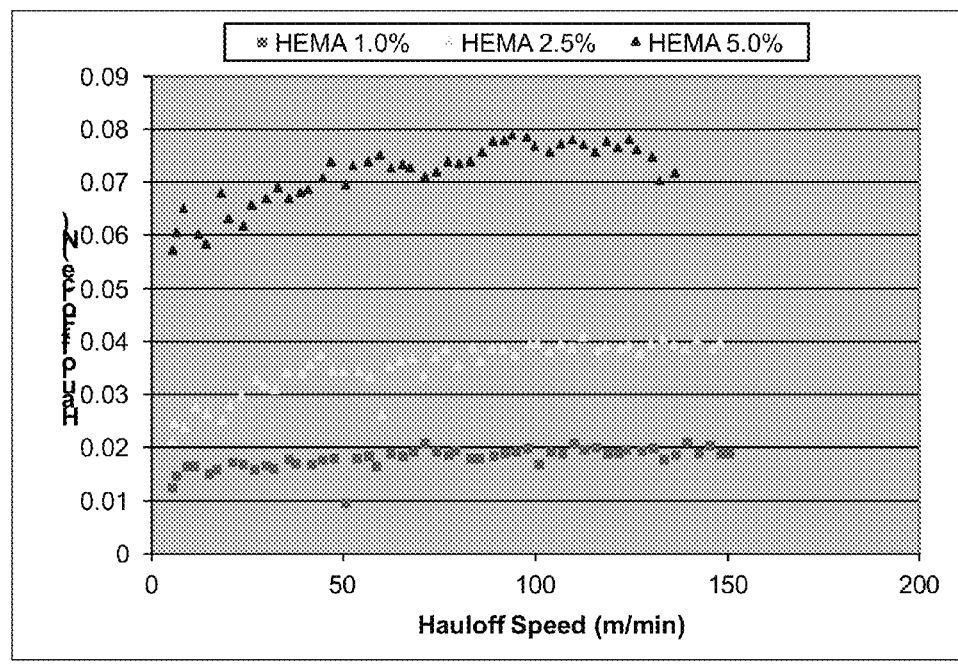
FIG. 3 is a graph of results from haul-off melt strength tests at various HEMA concentrations.

The concentration effect of hydroxyl groups on polystyrene properties is shown in Table 3 below. It appears that the measured molecular weights (Mw and Mz) increase while the melt flow rate decreases as the concentration of HEMA increases. The results suggest strengthened inter-chain interactions among polystyrene chains, possible due to the presence of polar interactions such as hydrogen bonding. The haul-off melt strength tests were also conducted on the polystyrene samples. A clear trend can be observed in FIG. 3, i.e., the melt strength of the material increases along with the concentration of HEMA. The improvement in the melt strength is desirable for foaming of polystyrene using $CO_2$ as the blowing agent.

TABLE 3

| | | | Characterization of HEMA-modified polystyrene | | | | |
|---|---|---|---|---|---|---|---|
| HEMA (wt. %) | Mn (g·mol$^{-1}$) | Mw (g·mol$^{-1}$) | Mz (g·mol$^{-1}$) | Mp (g·mol$^{-1}$) | PDI Mw/Mn | MFI (g·10 min$^{-1}$) | Tg (° C.) |
| 0.0 | 129,000 | 269,000 | 408,000 | 260,000 | 2.1 | 2.2 | 104.4 |
| 1.0 | 135,000 | 329,000 | 515,000 | 309,000 | 2.4 | 1.1~2.5 | 104.1 |
| 2.5 | 142,000 | 336,000 | 523,000 | 315,000 | 2.4 | 1.9~2.3 | 103.2 |
| 5.0 | 127,000 | 355,000 | 584,000 | 320,000 | 2.8 | 0.3 | 103.1 |

Example 3

Polymerization reactions were conducted to prepare PS copolymers containing different polar functional co-monomers. As described in earlier examples, the polymerization reaction was carried out in a CSTR-type batch reactor. Lupersol-233 was added as the initiator with an initial concentration of about 170 ppm in the reaction mixture. The reaction was then run isothermally at 130° C. with continuous agitation at 150 rpm for about 3 hours or until 75% conversion was obtained. The reaction mixture was then transferred onto an aluminum surface and devolatized under active vacuum of less than 10 torr at 225° C. for 45 minutes.

The co-monomers used include 2-hydroxylethyl methacrylate (HEMA, 98%, CAS#868-77-9), glycidyl methacrylate (GMA, CAS#106-91-2), butyl methacrylate (Butyl MA, CAS#97-88-1), isodecyl methacrylate (Isodecyl MA, CAS#29964-84-9), 2,2,3,4,4,4-hexafluorobutyl acrylate (Fluorinated, CAS#54052-90-3), 3-(trimethoxysilyl)propyl methacrylate (Silyl, CAS#2530-85-0), caprolactone acrylate (Caprolactone, CAS#110489-05-9), methoxy polyethylene glycol (350) monomethacrylate (PEG350-MA, CAS#26915-

72-0) or methoxy polyethylene glycol (550) monomethacrylate (PEG550-MA, CAS#26915-72-0).

The solubility and diffusivity of $CO_2$ in the copolymers were subsequently measured using the method described below. The results are listed in Table 4, with other characterization data.

Example 4

Measurement of $CO_2$ Solubility

Figure 4:
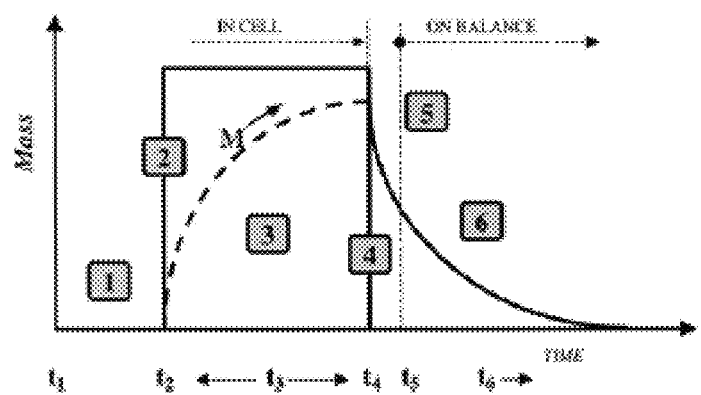
FIG. 4 is a diagram illustrating the experimental scheme of dynamic gravimetric measurement of $CO_2$ solubility.

The general scheme of measurement is illustrated in FIG. 4. Polymer samples were molded into disks with a thickness of 1.4 mm and a diameter of 25 mm. The relatively large surface area on both sides of the disks ensures that the diffusion of gas occurs mainly in the normal direction of the disk planes. The sample disk was weighed ($M_{ini}$) and then transferred into a Parr pressure vessel, which was purged with $CO_2$ at least 3 times, subsequently heated to 50° C. and pressurized with carbon dioxide to 1,500 psi to reach a supercritical state. Both temperature and pressure were maintained for a period of time ($t_3$ in FIG. 4) to allow $CO_2$ absorption into the sample disk. The pressure is then released instantaneously to atmosphere (at $t_4$). The sample disk is quickly taken from the pressure vessel and placed onto a moisture balance (Ohaus) to record the weight loss as a function of time under ambient conditions. Reduction of sample weight was observed due to desorption of $CO_2$. The dynamic evolution of weight ($M_t$) was recorded by a computer and WinWedge program. The dynamic weight change of the sample disk recorded (after $t_5$) was used to calculate the $CO_2$ solubility as well as diffusivity with the aid of Fick's diffusion law and appropriate boundary conditions. The weight data recorded (after $t_5$) can be extrapolated to the initial weight (at $t_4$), prior to the depressurization, to obtain the $CO_2$ absorption concentration as well as the desorption rate of $CO_2$.

The amount of $CO_2$ remaining in the sample disk at any given moment can be represented by $M_{gas,t}$ and calculated according to equation: $M_{gas,t}=(M_t-M_{ini})/M_{ini}\times 100\%$. The amount of $CO_2$ dissolved in a sample under equilibrium conditions is $M_{gas,t}$ at t=0, i.e., right before the depressurization. $M_{gas,t}$ should drop as a function of time (t) and eventually approach zero when t=∞.

To find the amount of $CO_2$ dissolved in the sample prior to the depressurization, one needs to extrapolate the data to t=0. Assuming a constant diffusion coefficient of $CO_2$, it can be shown from literature that $M_{gas,t}$ is a linear function of the square root of time:

$$M_{gas,t} = M_{gas,0} - \frac{4}{l}\cdot\sqrt{\frac{D\cdot t}{\pi}}\cdot M_{gas,0} \quad \text{(Equation 1)}$$

where l is the thickness of the sample disk and D is the diffusion coefficient of $CO_2$. Use of this equation implicitly assumes uniformity of the initial gas concentration and homogeneity and isotropy of the sample structure. It also implies that the diffusion coefficient is constant regardless of the desorption time, gas concentration in the sample during desorption and temperature variation which could exist during the depressurization process. By making a linear plot of $M_{gas,t}$ vs. $t_{1/2}$, one can calculate $M_{gas,0}$ and D from the intercept (at t=0) and slope, which corresponds to $CO_2$ solubility and diffusivity in the sample polymer, respectively.

$CO_2$ Solubility in Modified PS

Figure 5:
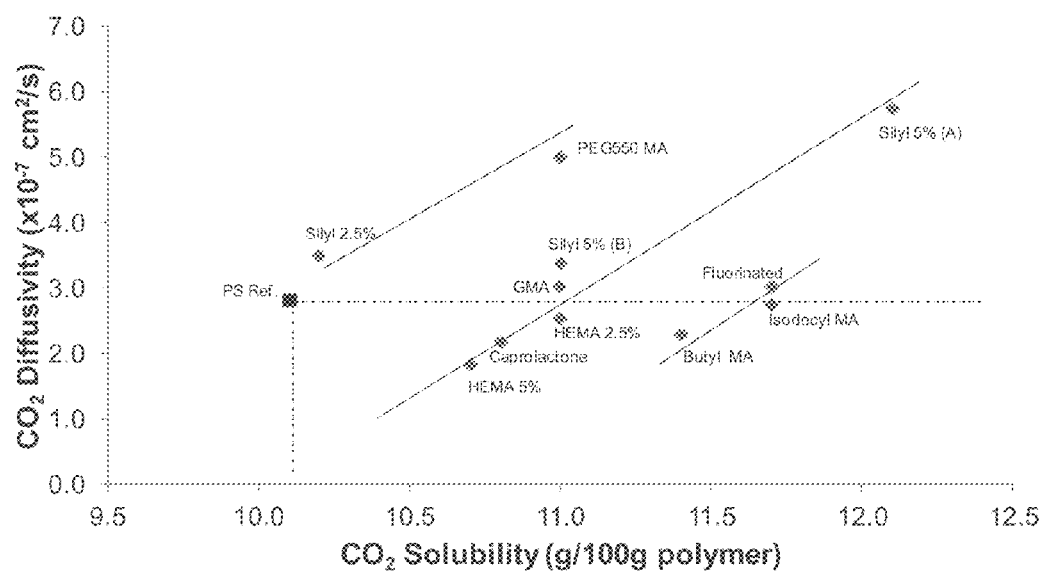
FIG. 5 is a graph of $CO_2$ desorption versus $CO_2$ solubility.

Dynamic $CO_2$ solubility measurements were conducted on an un-modified PS reference, commercial poly(styrene-co-acrylonitrile) (SAN) and a series of polarity-modified PS lab samples. Table 4 below lists the results by the name of co-monomers in the polystyrene copolymers. A plot of $CO_2$ diffusivity versus solubility of various samples was also constructed as shown in FIG. 5.

Compared to the un-modified polystyrene, SAN showed significantly higher $CO_2$ solubility (15.6%) and lower $CO_2$ desorption diffusivity ($1.1\times 10^{-7}$ cm$^2$/s). The affinity of polar groups in SAN toward $CO_2$ may partially explain, from an enthalpy point of view, the enhanced (thermodynamic) solubility and slowed (kinetic) diffusivity. The swelling in $CO_2$ was small (<5% in thickness) for both SAN and PS.

Besides SAN, it is clear that all the polarity-modified PS copolymers show higher $CO_2$ solubility, more or less, when compared to the un-modified PS reference. The greatest $CO_2$ solubility enhancement was observed on 3-(trimethoxysilyl) propyl methacrylate-modified PS (Silyl-PS) with a 20% increase of solubility. This was followed by PS copolymerized with alkyl methacrylates or fluorinated acrylate. The fact that none of the samples has lower $CO_2$ solubility than the un-modified PS demonstrates the effectiveness of polarity-driven structural modification of PS for $CO_2$ solubility enhancement.

The high gas diffusivity is not desired for foaming processes as it has a negative impact on cell morphology control and can lead to accelerated gas exchange with air (foam aging). Among the different modified PS tested, there appear to be a few copolymers which actually show lower diffusivity than the un-modified PS reference. Examples include HEMA-, alkyl methacrylate- and caprolactone-modified PS.

TABLE 4

$CO_2$ Solubility and Diffusivity in PS Copolymers (CO2 Soaking Conditions: 1500 psi, 50° C.)

| Sample | Co-monomer (wt. %) | Solubility (g per 100 g polymer) | Diffusivity ($10^{-7}$ cm$^2$sec$^{-1}$, 25° C.) | Swell % | $T_g$ (° C.) | MI (g/10 min) | Mn | Mw | Mz | Mw/Mn | Mp |
|---|---|---|---|---|---|---|---|---|---|---|---|
| PS Ref. | 0 | 10.1 | 2.8 | 5% | 104 | 2.2 | 129,000 | 269,000 | 308,000 | 2.1 | 260,000 |
| SAN | 25 | 15.6 | 1.1 | 4% | 105 | | | 165000* | | | |
| HEMA | 5.0 | 10.7 | 1.9 | 3% | 103 | 0.3 | 127,000 | 355,000 | 584,000 | 2.8 | 320,000 |
| HEMA | 2.5 | 11.0 | 2.6 | 7% | 103 | 1.9 | 142,000 | 336,000 | 523,000 | 2.4 | 315,000 |
| GMA | 5.0 | 11.0 | 3.0 | 4% | 101 | 2.4 | 125,000 | 277,000 | 435,000 | 2.2 | 261,000 |
| Butyl MA | 5.0 | 11.4 | 2.3 | 2% | 98 | 2.9 | 122,000 | 260,000 | 398,000 | 2.1 | 250,000 |

TABLE 4-continued $CO_2$ Solubility and Diffusivity in PS Copolymers (CO2 Soaking Conditions: 1500 psi, 50° C.)

| Sample | Co-monomer (wt. %) | Solubility (g per 100 g polymer) | Diffusivity ($10^{-7}$ cm$^2$sec$^{-1}$, 25° C.) | Swell % | $T_g$ (° C.) | MI (g/10 min) | Mn | Mw | Mz | Mw/Mn | Mp |
|---|---|---|---|---|---|---|---|---|---|---|---|
| Isodecyl MA | 5.0 | 11.7 | 2.8 | 13% | 94 | 3.0 | 141,000 | 362,000 | 668,000 | 2.6 | 273,000 |
| Flurinated | 5.0 | 11.7 | 3.0 | 12% | 96 | n/a | 125,000 | 265,000 | 409,000 | 2.1 | 252,000 |
| Silyl | 2.5 | 10.2 | 3.5 | 6% | 101 | 2.6 | 128,000 | 298,000 | 493,000 | 2.3 | 260,000 |
| Silyl | 5.0 | 12.1 | 5.8 | 36% | 97 | n/a | 132,000 | 335,000 | 630,000 | 2.5 | 261,000 |
| Caprolactone | 2.5 | 10.8 | 2.2 | 9% | 92 | n/a | 139,000 | 522,000 | 1,144,000 | 3.8 | 248,000 |
| PEG350 MA | 5.0 | 11.4 | n/a | n/a | 81 | 0.3 | 69,000 | 383,000 | 1,107,000 | 5.6 | 167,000 |
| PEG550 MA | 5.0 | 11.0 | 5.0 | 30% | 80 | 4.4 | 106,000 | 334,000 | 681,000 | 3.2 | 242,000 |

Figure 6:
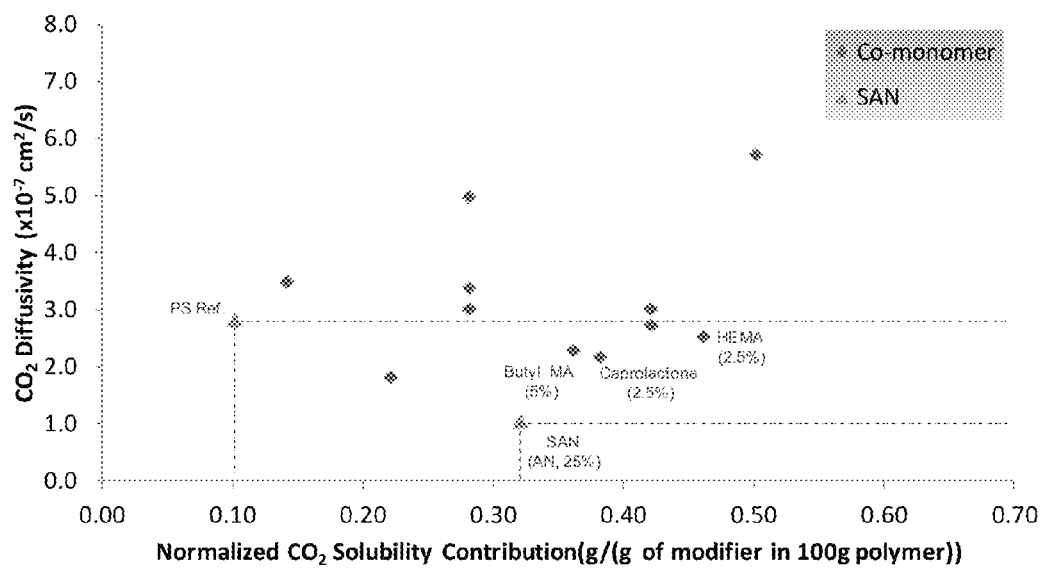
FIG. 6 is a graph of $CO_2$ desorption versus normalized $CO_2$ solubility.

The measured $CO_2$ solubility data have indicated enhanced $CO_2$ solubility when the polar co-monomers of various concentrations are incorporated into polystyrene. To compare the modifier efficiency in $CO_2$ solubility improvement, the portion of $CO_2$ solubility contributed by the co-monomer was normalized based on the weight. The normalized data (Table 5 and FIG. 6) showed that the silyl methacrylate and HEMA were more effective to boost $CO_2$ solubility than other co-monomers. Interestingly, acrylonitrile had only moderate efficiency on $CO_2$ solubility enhancement, comparable to isodecyl- and fluorinated acrylates.

TABLE 5

Normalized $CO_2$ Solubility and Diffusivity in PS Copolymers (CO2 Soaking Conditions: 1500 psi, 50° C.)

| Sample | Co-monomer(wt. %) | Solubility (g per 100 g polymer) | Solubility Contribution-Comonomer ($S_{CO2\text{-}extra}$) | $S_{CO2\text{-}extra}$/Mass of Comonomer | Diffusivity ($10^{-7}$ cm$^2$sec$^{-1}$, 25° C.) |
|---|---|---|---|---|---|
| PS Ref. | 0 | 10.1 | 0.0 | 0.10 | 2.8 |
| SAN | 25 | 15.6 | 8.0 | 3.32 | 1.1 |
| HEMA | 5.0 | 10.7 | 1.1 | 0.22 | 1.9 |
| HEMA | 2.5 | 11.0 | 1.2 | 0.46 | 2.6 |
| GMA | 5.0 | 11.0 | 1.4 | 0.28 | 3.0 |
| Butyl MA | 5.0 | 11.4 | 1.8 | 0.36 | 2.3 |
| Isodecyl MA | 5.0 | 11.7 | 2.1 | 0.42 | 2.8 |
| Flurinated | 5.0 | 11.7 | 2.1 | 0.42 | 3.0 |
| Silyl | 2.5 | 10.2 | 0.4 | 0.14 | 3.5 |
| Silyl | 5.0 | 12.1 | 2.5 | 0.50 | 5.8 |
| Caprolactone | 2.5 | 10.8 | 1.0 | 0.38 | 2.2 |
| PEG350 MA | 5.0 | 11.4 | 1.8 | 0.36 | n/a |
| PEG550 MA | 5.0 | 11.0 | 1.4 | 0.28 | 5.0 |

With both diffusivity and normalized solubility considered, there appeared to be a few co-monomers which achieved a good balance of diffusivity and solubility. Examples included the caprolactone, butyl and hydroxyethyl methacrylate modified PS. The $CO_2$ solubility improvement in these modified PS exceeded that in SAN while the diffusivity was well contained to be below that in the un-modified PS. Commercial SAN has a very low $CO_2$ diffusivity of $1.1 \times 10^{-7}$ cm$^2$/s, despite its high $CO_2$ solubility.

Overall, the results clearly demonstrate that the presence of polar groups in polystyrene can lead to a higher $CO_2$ solubility. A $CO_2$ solubility enhancement will benefit foaming of polystyrene using CO2 as the blowing agent.

As used herein, the term "monomer" refers to a relatively simple compound, usually containing carbon and of low molecular weight, which can react by combining one or more similar compounds with itself to produce a polymer.

As used herein, the term "co-monomer" refers to a monomer that is copolymerized with at least one different monomer in a copolymerization reaction resulting in a copolymer.

As used herein, the term "homopolymer" refers to a polymer resulting from polymerization of a single monomer species.

As used herein, the term "co-polymer," also known as a "heteropolymer," is a polymer resulting from polymerization of two or more monomer species.

As used herein, the term "copolymerization" refers to the simultaneous polymerization of two or more monomer species.

As used herein, the term "polymer" generally includes, but is not limited to homopolymers, co-polymers, such as, for example, block, graft, random and alternating copolymers, and combinations and modifications thereof.

As used herein, the terms "Continuous Stirred Tank Reactor," "Continuously Stirred Tank Reactor" and "CSTR," refer to a tank which has a rotor that stirs reagents within the tank to ensure proper mixing, a CSTR can be used for a variety of reactions and processes and is generally known in the art.

The various embodiments of the present invention can be joined in combination with other embodiments of the invention and the listed embodiments herein are not meant to limit the invention. All combinations of various embodiments of the invention are enabled, even if not given in a particular example herein.

While illustrative embodiments have been depicted and described, modifications thereof can be made by one skilled in the art without departing from the spirit and scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Depending on the context, all references herein to the "invention" may in some cases refer to certain specific embodiments only. In other cases it may refer to subject matter recited in one or more, but not necessarily all, of the claims. While the foregoing is directed to embodiments, versions and examples of the present invention, which are included to enable a person of ordinary skill in the art to make and use the inventions when the information in this patent is combined with available information and technology, the inventions are not limited to only these particular embodiments, versions and examples. Also, it is within the scope of this disclosure that the aspects and embodiments disclosed herein are usable and combinable with every other embodiment and/or aspect disclosed herein, and consequently, this disclosure is enabling for any and all combinations of the embodiments and/or aspects disclosed herein. Other and further embodiments, versions and examples of the invention may be devised without departing from the basic scope thereof and the scope thereof is determined by the claims that follow.

What is claimed is:

1. A foamable polystyrene composition comprising:
   a blowing agent comprising carbon dioxide ($CO_2$); and
   a styrenic co-polymer resulting from polymerization of a reaction mixture comprising a styrenic monomer and from 0.5 to 20 wt % a co-monomer comprising a polar functional that is hydroxyethylmethacrylate (HEMA) or caprolactone acrylate, wherein the styrenic co-polymer exhibits increased solubility of $CO_2$ and decreased diffusivity of $CO_2$ in comparison to a styrene polymer that is not modified with a co-monomer having a polar functional group.

2. The foamable polystyrene composition of claim 1, wherein the styrenic monomer is selected from the group consisting of styrene, alpha-methyl styrene, vinyl toluene, p-methyl styrene, t-butyl styrene, o-chlorostyrene, vinyl pyridine, and any combinations thereof.

3. The foamable polystyrene composition of claim 1, wherein the co-monomer comprising a polar functional group is present in amounts ranging from 0.5 to 10 wt % based on the total weight of the reaction mixture.

4. The foamable polystyrene composition of claim 1, wherein the co-monomer comprising a polar functional group is caprolactone acrylate.

5. The foamable polystyrene composition of claim 1, wherein styrene is present in amounts ranging from 90 to 99 wt % based on the total weight of the styrenic co-polymer.

6. The foamable polystyrene composition of claim 1, wherein the co-monomer comprising a polar functional group is HEMA.

7. The foamable polystyrene composition of claim 1, wherein the blowing agent is entirely composed of the $CO_2$.

8. The foamable polystyrene composition of claim 1, wherein the blowing agent further comprises water ($H_2O$), ethanol, air, nitrogen, argon, helium or combinations thereof.

9. The foamable polystyrene composition of claim 1, wherein the blowing agent is present in the styrenic co-polymer in a weight proportion ranging from 1 to 30 parts per 100 parts of styrenic material.

10. A polystyrene foam obtained from the foamable polystyrene composition of claim 1.

11. An article made from the polystyrene foam of claim 10.

12. A method of making a polar polystyrene copolymer comprising:
    combining a styrene monomer and a polar co-monomer that is hydroxyethylmethacrylate (HEMA) or caprolactone acrylate to obtain a reaction mixture, wherein the reaction mixture comprises from 0.5 to 20 wt % of the polar co-monomer;
    subjecting the reaction mixture to polymerization conditions to obtain a styrenic co-polymer; and
    combining the styrenic co-polymer with a blowing agent comprising carbon dioxide ($CO_2$) to obtain a foamable blend, wherein the styrenic co-polymer exhibits increased solubility of $CO_2$ and decreased diffusivity of $CO_2$ in comparison to a styrene polymer that is not modified with a co-monomer having a polar functional group.

13. The method of claim 12, wherein the polar co-monomer is caprolactone acrylate.

14. The method of claim 12, wherein the polar co-monomer is HEMA.

15. The method of claim 12, wherein the polar co-monomer is added to the reaction mixture in amounts ranging from 0.5 to 10 wt % based on the total weight of the reaction mixture.

16. The method of claim 12, wherein the blowing agent further comprises water ($H_2O$), ethanol, air, nitrogen, argon, helium or combinations thereof.

17. The method of claim 12, wherein the blowing agent is added to the styrenic co-polymer in a weight proportion ranging from 1 to 30 parts per 100 parts of styrenic co-polymer.

18. An expandable polystyrene, comprising:
    a styrenic copolymer; and
    a blowing agent comprising carbon dioxide ($CO_2$);
    wherein the styrenic polymer results from polymerization of a reaction mixture of a styrene monomer and from 1 to 20 wt % of a co-monomer having a polar functional group, wherein the styrenic copolymer exhibits increased solubility of $CO_2$ and decreased diffusivity of $CO_2$ in comparison to a styrene polymer that is not modified with a co-monomer having a polar functional group;
    wherein the co-monomer having a polar functional group is hydroxyethylmethacrylate (HEMA) or caprolactone acrylate.

19. The expandable polystyrene of claim 18, wherein the co-monomer having a polar functional group is caprolactone acrylate.

20. The expandable polystyrene of claim 18, wherein the blowing agent further comprises water ($H_2O$), ethanol, air, nitrogen, argon, helium or combinations thereof.

21. The expandable polystyrene of claim 18, wherein the blowing agent is incorporated into the expandable polystyrene in a weight proportion ranging from 1 to 30 parts per 100 parts of the styrenic copolymer.

22. The foamable polystyrene composition of claim 18, wherein the co-monomer comprising a polar functional group is HEMA.

* * * * *